Figure 1:
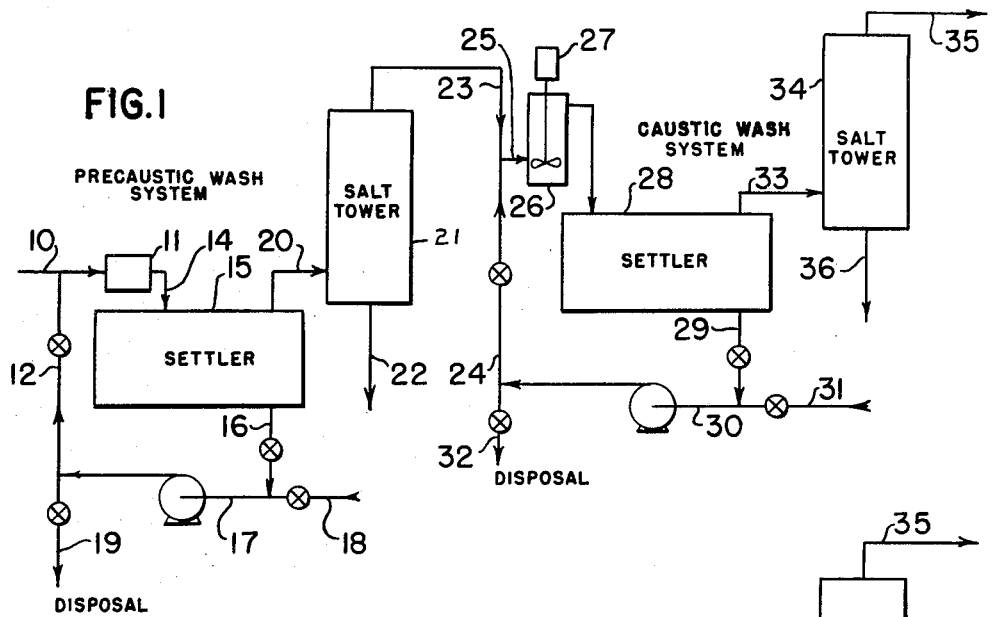
Figure 2:
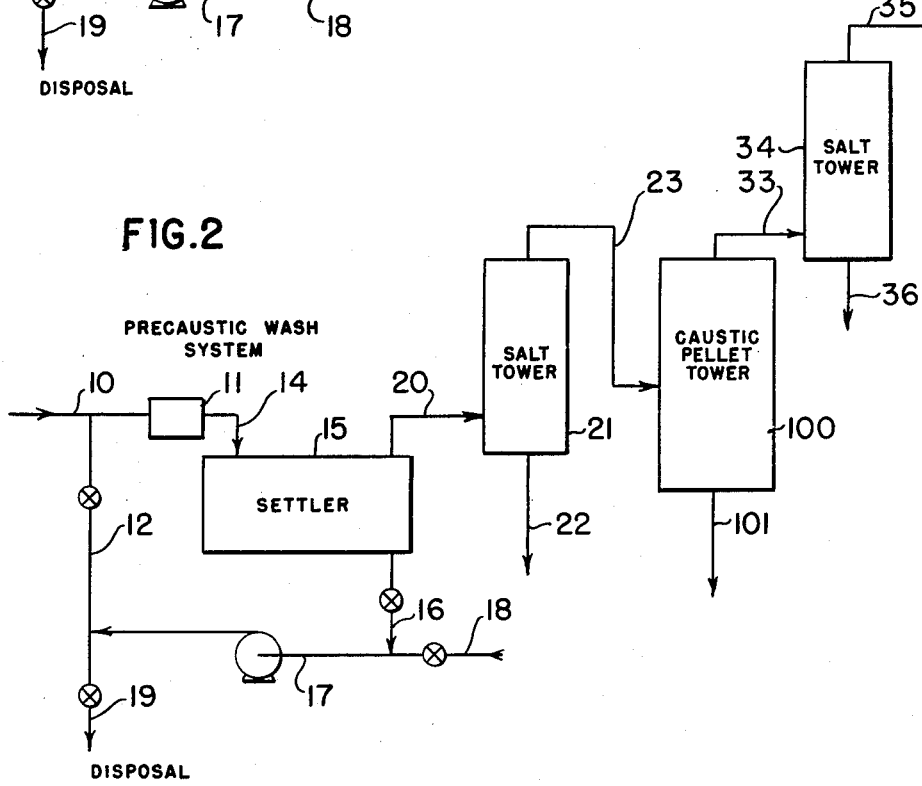

Jan. 22, 1957     F. A. APGAR     2,778,778
PROCESS FOR REMOVING SILICA FROM HYDROCARBONS
BY TREATING WITH CAUSTIC SODA
Filed Oct. 21, 1950

INVENTOR.
Frank A. Apgar
BY
Adams, Forward and McLean
ATTORNEYS

United States Patent Office

2,778,778
Patented Jan. 22, 1957

2,778,778

PROCESS FOR REMOVING SILICA FROM HYDROCARBONS BY TREATING WITH CAUSTIC SODA

Frank A. Apgar, Chicago, Ill., assignor to Sinclair Refining Company, New York, N. Y., a corporation of Maine Application October 21, 1950, Serial No. 191,420

5 Claims. (Cl. 196—41)

This invention relates to improvements in hydrocarbon products, including particularly motor fuels, obtained by catalytic cracking or reforming, and in particular by the commercially used processes known as the Houdry process, the Fluid catalytic process and the Thermofor catalytic cracking process (T. C. C.).

In these processes, the hydrocarbon is cracked or reformed at high temperatures and in the vapor phase in the presence of an adsorptive gel-type catalyst, particularly a silica-gel type catalyst such as an activated natural clay or a synthetic silica-alumina or silica-magnesia cracking catalyst. In the Houdry process the catalyst is in the form of a fixed bed with the catalyst present as pills or pellets of appropriate size. In the Fluid catalyst process, the catalyst is used in the form of a finely divided powder which is carried into and through the reaction chamber concurrently with the oil vapors. In the Thermofor process the catalyst may be in the form of pellets, although it is usually in the form of spherical particles resembling glass beads, which are called synthetic beads, the catalyst being passed through the reaction chamber countercurrently to the oil vapors.

Each of these operations results in a cracked or reformed product containing a wide range of hydrocarbon products, from which appropriate fractions, e. g., for use as aviation gasoline or base stock therefor, as motor fuel or the like, are separated by fractionation. Heavier cuts may be recycled, or may be recovered as gas oil, furnace oil, or the like. The processes are well known and widely used.

I have discovered that the finished products from such catalytic cracking or reforming operations, including both the recovered overheads, that is, the motor fuels, whether having the characteristics of aviation gasoline or automobile fuel, as well as the heavier fractions, including the gas oil, contain significant quantities of the constituents of the catalyst, namely silica and alumina or magnesia, and contain them in quantities sufficient to cause difficulties, for example, in their use as motor fuels through the formation of intake system deposits and intake valve deposits, when so used, despite the careful distillation of the products involved in the fractionation subsequent to the cracking operation. I have found that these inorganic materials or catalyst carry-over, may be present in quantities ranging up to 3 mg. per 100 ml. in gasolines obtained by catalytic cracking operations. I have found them in gasolines from the Houdry, Thermofor and Fluid cracking processes as well as in side streams from the fractionating equipment of these processes, and I have found them in products of operations employing silica-magnesia as well as silica-alumina and clay type catalysts. I have noted that the presence of this inorganic material cannot be detected by visual inspection, nor is its presence in the products shown by the methods of inspection of petroleum products which are regularly used for either process or product control in the petroleum industry. I have been unable to detect the presence of the catalyst in these finished products by the use of the ultramicroscope. It is my belief that the catalyst is present in an extremely finely divided colloid, but this belief may be in error.

In accordance with the present invention, this inorganic material, that is, the silica and alumina or magnesia present in the products obtained by such catalytic cracking or reforming operations, is removed from the products, that is, the gasoline, gas oil, or the like, which may be in the form of finished products or may be blending stocks requiring further processing in any of the known ways for the production of finished products. I have found that these inorganic materials may be effectively removed from the hydrocarbon by treatment thereof with concentrated aqueous or solid caustic alkali, advantageously caustic soda because of cost considerations, but also by caustic potash. I have also found that in the treatment of the hydrocarbon containing the constituents of the catalyst, the strength of the caustic alkali solution is critical. At ordinary temperatures, i. e., between about 85° to 100° F., it is necessary to employ caustic alkali solutions of strength greater than about 47° Bé. to effectively remove the inorganic materials, with the effectiveness of removal increasing with increase in strength. Substantially complete removal is obtained with 50° Bé. caustic alkali solutions. Such concentrations are to be compared with caustic alkali solutions as strong as even 40° or 45° Bé. which are not effective even with substantial periods of contact between alkali and hydrocarbon. Further, increase in temperature of treatment to moderately elevated temperatures above 100° F. only slightly improves the degree of removal of inorganic material. Provision for thorough and complete contacting, however, is useful in terms of reducing the contact time required between caustic and hydrocarbon.

I have found that the threshold strength of caustic alkali required for substantially complete removal of inorganic materials from catalytically cracked hydrocarbon fractions is between 47° and 48° Baumé. For example, the following runs on a catalytic gasoline from Wyoming crude illustrate the presence of catalyst carry-over and the strength of caustic alkali necessary for its removal. The test gasoline was stabilized distillate as recovered from a fluid catalyst type operation using silica-alumina catalyst under conventional operating conditions, i. e., a reactor temperature of 890° F., a pressure of 10.1 p. s. i., a catalyst-oil ratio of 10:1, and a space velocity of 0.58, obtaining a 52.8 volume percent conversion and a 100.1 weight percent. recovery. The stabilizer conditions were 111° F. top temperature, 319° F. bottom temperature and 130 p. s. i., pressure. 2500 cc.'s of the stabilized distillate (400° F. ASTM End Point) was rerun yielding 90.7% overhead and 8.0% bottoms with a 1.3% loss. The presence of catalyst carry-over was established by analysis of the sediment recovered from the rerun bottoms. The recovered ash totaled 16.7 mgs. and contained 64.7% $SiO_2$ and 15.5% $Al_2O_3$.

The stabilized distillate before treatment with concentrated aqueous alkali solution was treated to remove any hydrogen sulfide present. It was then washed with a caustic alkali solution of dilute or ordinary concentration to remove phenols, naphthenic acids and any other acid components that may have been present, thus allowing full strength treatment of the inorganic material by the concentrated caustic alkali. The thoroughly agitated mixture was allowed to settle for a period of time sufficient for the organic and caustic phases to separate. To remove any traces of entrained caustic remaining in the hydrocarbon after settling and separation, the hydrocarbon was passed through a bed of salt particles.

The treatment with concentrated aqueous caustic alkali solutions was made according to my process at 75° F., in one quart French square glass bottles, on a mechanical shaker equipped with an eccentric head and operated at 400 R. P. M. The charge to each bottle was 500 cc. of hydrocarbon and 100 cc. of caustic solution. Each treat was made in duplicate and after a settling period the hydrocarbon was filtered through #619 Whatmen filter paper. 800 cc. of the treated gasoline were then charged to an Engler type glass flask and rerun to 5% bottoms. After cooling, the flask was visually examined for sediment in the bottoms and for deposit on the glass at the surface of the liquid. Sediment and/or deposit on the glass were taken as an indication of incomplete removal of constituents of the silica-alumina catalyst by the treat. Using sodium and potassium hydroxides at 30° Bé. to 50° Bé. strength the results were as follows:

agitation such as is obtained by mechanical means will provide the necessary degree of contact. In particular, careful selection of the contact equipment will have the advantage of reducing the period of contact required for satisfactory separation of the inorganic material. On the other hand, the actual period of contact is not controlling since very short intervals of time, such as ten minutes, will effectively separate the contaminants from the hydrocarbon products. Usually up to thirty minutes under vigorous mechanical agitation provides excellent contact. The temperature of treatment has little effect on the effectiveness of separation, except where, for in-

| Caustic Treats | Sodium Hydroxide | | | | | | Potassium Hydroxide | | | | |
|---|---|---|---|---|---|---|---|---|---|---|---|
| Contact Time (Minutes) | 5 | 10 | 15 | 20 | 30 | 60 | 10 | 15 | 20 | 30 | 60 |
| Strength of Solution | 50° Bé. | | | | | | 50° Bé. | | | | |
| Settling Time (Minutes) | | 30 | 30 | 20 | 30 | | 30 | 60 | 15 | | |
| Sediment | | Trace | None | Trace | Trace | | Trace | Trace | Trace | | |
| Deposit on Glass | | Trace | None | None | None | | Light | Trace | Trace | | |
| Strength of Solution | 48° Bé. | | | | | | 48° Bé. | | | | |
| Settling Time (Minutes) | | | | 30 | | | | | 30 | | |
| Sediment | | | | Trace | | | | | Trace | | |
| Deposit on Glass | | | | Trace | | | | | Trace | | |
| Strength of Solution | 47° Bé. | | | | | | 47° Bé. | | | | |
| Settling Time (Minutes) | | | | 30 | | | | | 30 | | |
| Sediment | | | | Heavy | | | | | Heavy | | |
| Deposit on Glass | | | | Trace | | | | | Trace | | |
| Strength of Solution | 45° Bé. | | | | | | 45° Bé. | | | | |
| Settling Time | | | | 30 | | | | | 30 | | |
| Sediment | | | | Heavy | | | | | Heavy | | |
| Deposit on Glass | | | | Trace | | | | | Trace | | |
| Strength of Solution | 40° Bé. | | | | | | 40° Bé. | | | | |
| Settling Time (Minutes) | 30 | | | 60 | | | | 10 | 20 | | |
| Sediment | Heavy | | | Heavy | | | | Heavy | Heavy | | |
| Deposit on Glass | Heavy | | | Heavy | | | | Trace | None | | |
| Strength of Solution | 30° Bé. | | | | | | 30° Bé. | | | | |
| Settling Time (Minutes) | | | | | | 60 | | | | | 60 |
| Sediment | | | | | | Trace | | | | | Heavy |
| Deposit on Glass | | | | | | Heavy | | | | | Heavy |

By caustic alkalis I mean to include sodium hydroxide and potassium hydroxide since I have found both to be satisfactory in terms of catalyst removal. Of course, potassium hydroxide is at ordinary disadvantage because of cost. Although I have referred to the use of caustic alkali in concentrated aqueous solution it is also possible to use the alkali in dry form. In particular, the caustic may be contacted in solid form as pellets or beads, or advantageously in the form of inert materials coated with caustic for maximum economy of operation. In any event, solid dry caustic alkali as well as concentrated aqueous solutions is valuable in providing alkali of the necessary strength for effective removal of the contaminating inorganic materials.

The amount of 48°–50° Bé. caustic alkali solution employed should be sufficient to provide good contact with the hydrocarbon being treated. This will vary depending upon such conditions as the stock handled, temperature, and contact procedure. Effective treatment is obtained using about 15 to 25% of caustic by volume in the feed. Usually about 20% by volume is satisfactory under the widest range of conditions of processing. The degree of contact between the 48°–50° Bé. caustic and hydrocarbon is naturally important in terms of inorganic removal since it is necessary to have complete contact of both hydrocarbon and caustic phases. Thorough stance at low temperatures, increased viscosity results and contact is obviously more difficult. However, treatments at 85° to 100° F. are generally satisfactory.

The thoroughly agitated mixture is then allowed to settle for a period of time sufficient for the organic and caustic phase to separate. Ordinary settling depending on gravity will be satisfactory for periods of, say, one hour and more. To remove any traces of entrained caustic remaining in the hydrocarbon after settling and separation, passage through a bed of salt particles is advisable.

I have found that it is particularly advantageous to precede the concentrated caustic alkali treatment with a wash containing caustic alkali at ordinary or dilute concentrations. Acidic materials present in the stock such as phenols and naphthenic acids which may interfere with the main treatment are effectively removed thereby allowing full strength treatment of the inorganic material by the concentrated caustic alkali. Consumption of alkali in the main treatment is markedly reduced and in some instances valuable by-products are recovered from the preliminary wash. The preliminary dilute caustic wash is carried out at temperatures approximating atmospheric and the concentration employed varies from a maximum of about 40° Baumé, for a gasoline, down to about 25° Baumé for a catalytic cycle oil. I have found that a good rule of thumb to follow is to employ the maximum strength which will not allow separation of a layer of reaction products between the feed and caustic solution when settled. Generally, pretreatment is satisfactorily accomplished at a rate of about 20% by volume of caustic alkali on the hydrocarbon feed. However, it is advantageous to remove any hydrogen sulfide that may be present in the feed stock to prevent corrosion of the equipment and so that the dilute caustic solution will not be poisoned and unavailable for recycle.

The accompanying drawings illustrate two methods of carrying out the present process. Figure I shows an embodiment in which the charge stock is pretreated with dilute caustic and then contacted with a strong caustic solution. Figure II shows the use of solid caustic, either in the form of pellets or as pellets of inert material coated with solid caustic.

According to the process of Figure I, a distillate feed stock from a catalytic cracking operation, boiling with gasoline range of 225° to 400° F. and free of hydrogen sulfide, is charged to the system by line 10. The feed is first pretreated with dilute caustic by admixing in mixer 11 with dilute sodium hydroxide solution of gravity about 40° Bé. from line 12. The dilute caustic is added in amount of about 20% by volume on the hydrocarbon. The thoroughly agitated solution of caustic and hydrocarbon from the mixer 11 is passed by line 14 to settler 15 wherein the caustic and inorganic impurities settle and are removed by line 16. The caustic may be recirculated back to the settler in admixture with fresh caustic to strengthen the solution to about 40° Bé. by means of line 17. Fresh caustic is added from line 18 and when the mixture is depleted or severely contaminated it may be bled out of the system by line 19. The hydrocarbon feed so treated is then passed by line 20 to a tower 21 packed with salt particles, e. g., ¼" diameter sodium chloride particles. This is to remove entrained caustic solution and prevent it from diluting the concentrated solution in the caustic wash. The dilute solution so separated is removed from the system by drain 22. The feed is then passed to the second settling tank 28 in admixture with sodium hydroxide of 48°–50° Bé. gravity. The sodium hydroxide solution is added in the amount of 20% by volume on the hydrocarbon feed. This is accomplished by passing the feed through line 23 where it is contacted with the sodium hydroxide from line 24, the mixture being carried by line 25 to mixing zone 26, a vessel equipped with mechanical agitator 27 to insure thorough admixture of the two components. When completely mixed, the mixture is passed to the settler 28 and settled. The mixture is settled for a period of at least one hour to insure good separation. The caustic and inorganic impurities separate, settle to the bottom and are removed by line 29. The caustic is recirculated back to the settler 28 with fresh caustic by means of line 30 to maintain the caustic at a strength between 48°–50° Bé. The fresh caustic is added from line 31 and when the mixture is depleted or severely contaminated it may be bled out of the system by line 32. The hydrocarbon stock so treated is then passed by line 33 to a second tower 34 packed with salt particles for the purpose of removing entrained caustic solution before the product is passed to storage by line 35. The caustic solution so separated is removed from the system by drain 36.

The process illustrated by Figure II is identical with that shown by Figure I except that in place of the concentrated caustic solution the hydrocarbon from the dilute caustic pretreat step is contacted with solid caustic. That is, after the entrained dilute caustic solution has been removed from the hydrocarbon in salt tower 21 it is passed directly by line 23 to a tower 100 packed with solid caustic. The caustic may comprise solid pellets or caustic-coated inert particles as presently available. Advantageously, caustic-coated inert particles are employed since more economical use of caustic is thereby possible. From the solid caustic-packed tower a drain 101 is provided for escape of impurities and any liquid caustic that might form. The hydrocarbon stock so treated is then passed to the second salt tower 34 by line 33 as before and the process completed in the same manner.

This application is a continuation-in-part of my pending application Serial No. 686,436, filed July 26, 1946, later abandoned.

I claim:

1. A process which comprises bringing hydrocarbon stock, formed by the catalytic conversion of other hydrocarbon stock in the presence of a silica-base catalyst and containing finely dispersed constituents of the silica-base catalyst, into intimate contact with caustic alkali having a strength equivalent to at least 48° Baumé, whereby the finely dispersed constituents of the silica-base catalyst are substantially completely removed from the first mentioned hydrocarbon, and then separating the first-mentioned hydrocarbon substantially free of silica-base inorganic material from the caustic alkali.

2. A process which comprises bringing hydrocarbon stock, formed by the catalytic conversion of other hydrocarbon stock in the presence of a silica-base catalyst and containing finely dispersed constituents of the silica-base catalyst, into intimate contact with an aqueous solution of caustic alkali of at least 48° Baumé strength in an amount approximating 15 to 25% by volume on the first-mentioned hydrocarbon stock, whereby the finely dispersed constituents of the silica-base catalyst are substantially completely removed from the first-mentioned hydrocarbon, and then separating the first-mentioned hydrocarbon substantially free of silica-base inorganic material from the caustic alkali.

3. A process which comprises intimately contacting a hydrocarbon stock, formed by the catalytic conversion of another hydrocarbon stock in the presence of a silica-base catalyst and containing finely dispersed constituents of the silica-base catalyst, in an initial stage with caustic alkali in aqueous solution having a strength of between 25° and 40° Baumé whereby any contaminating acids are removed, separating the acid-free hydrocarbon from the caustic alkali, withdrawing the acid-free hydrocarbon from the initial stage, intimately contacting the acid-free hydrocarbon in a secondary stage with caustic alkali having a strength equivalent to at least 48° Baumé whereby the finely dispersed constituents of the silica-base catalyst are substantially completely removed and separating a hydrocarbon that is substantially completely free of silica-base inorganic material from the caustic alkali and withdrawing the hydrocarbon from the secondary stage.

4. A process which comprises intimately contacting a hydrocarbon stock, formed by the catalytic conversion of another hydrocarbon stock in the presence of a silica-base catalyst and containing finely dispersed constituents of the silica-base catalyst, in an initial stage with caustic alkali in aqueous solution having a strength of between 25° and 40° Baumé in an amount approximating 15 to 25 percent by volume of the hydrocarbon feed to the initial stage whereby any contaminating acids are removed, separating the acid-free hydrocarbon from the caustic alkali, withdrawing the acid-free hydrocarbon from the initial stage, intimately contacting the acid-free hydrocarbon in a secondary stage with an aqueous solution of caustic alkali of at least 48° Baumé strength in an amount approximating 15 to 25 percent by volume on the hydrocarbon feed to the secondary stage whereby the finely dispersed constituents of the silica-base catalyst are substantially completely removed and separating a hydrocarbon that is substantially completely free of silica-base inorganic material from the caustic alkali and withdrawing the hydrocarbon from the secondary stage.

5. A process which comprises intimately contacting a hydrocarbon stock, formed by the catalytic conversion of another hydrocarbon stock in the presence of a silica-base catalyst and containing finely dispersed constituents of the silica-base catalyst, in an initial stage with caustic alkali in aqueous solution having a strength of between 25° and 40° Baumé in an amount approximating 15 to 25 percent by volume of the hydrocarbon feed to the initial stage whereby any contaminating acids are removed, separating the acid-free hydrocarbon from the caustic alkali, withdrawing the acid-free hydrocarbon from the initial stage, intimately contacting the acid-free hydrocarbon in a secondary stage with solid caustic alkali in an amount sufficient to remove the finely dispersed constituents of the silica-base catalyst, separating a hydrocarbon that is substantially completely free of silica-base inorganic material from the caustic alkali and withdrawing the hydrocarbon from the secondary stage.

References Cited in the file of this patent

UNITED STATES PATENTS

| | | |
|---|---|---|
| 1,799,858 | Miller | Apr. 7, 1931 |
| 2,347,515 | Schmidl | Apr. 25, 1944 |
| 2,412,010 | Rippeteau | Dec. 3, 1946 |
| 2,430,015 | Hatton et al. | Nov. 4, 1947 |
| 2,431,770 | Payne et al. | Dec. 2, 1947 |